Aug. 25, 1925.

F. D. RUCKMAN

ANTISKID CHAIN

Filed Feb. 16, 1924

1,551,266

INVENTOR
Fred D. Ruckman
By Bakj & Macklin,
ATTORNEYS

Patented Aug. 25, 1925.

1,551,266

UNITED STATES PATENT OFFICE.

FRED D. RUCKMAN, OF CLEVELAND, OHIO.

ANTISKID CHAIN.

Application filed February 16, 1924. Serial No. 693,207.

*To all whom it may concern:*

Be it known that I, FRED D. RUCKMAN, a citizen of the United States, residing at Cleveland, in the county of Cuyahoga and State of Ohio, have invented a certain new and useful Improvement in Antiskid Chains, of which the following is a full, clear, and exact description, reference being had to the accompanying drawings.

This invention is directed to anti-skid devices for vehicles and has for its general object the provision of an anti-skid chain construction the sections of which may be readily assembled or taken apart without necessitating the use of tools or special devices.

A further object of my invention is the provision of a link lock which may be readily embodied in an anti-skid chain of the well known commercial type, which when once the chain sections are assembled, will serve to prevent disengagement of the chain sections from the circumferential stretches of the chain. A still further object is the provision of a detachable chain connection which may be of such character as to be readily disconnected from both the transverse and circumferential chain stretches and which may be conveniently manufactured.

Other objects of my invention will hereinafter be set forth in the following description referring to the accompanying drawings which illustrate a preferred embodiment thereof. The essential characteristics are summarized in the claims.

Figure 1:
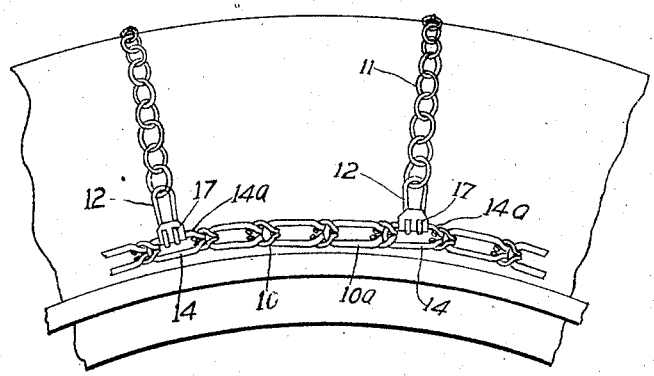
Figure 2:
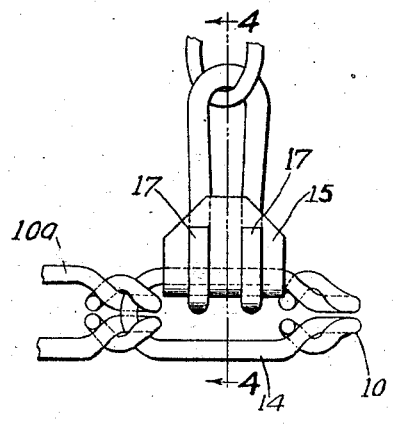
Figure 3:
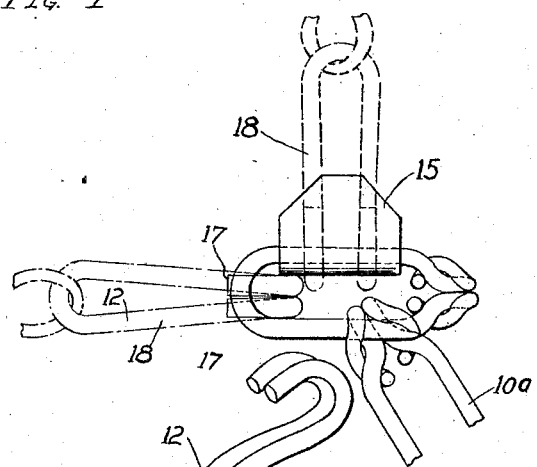
Figure 4:
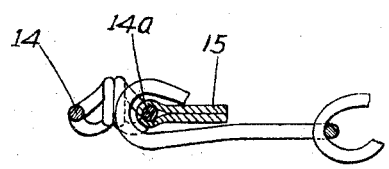

In the drawings Fig. 1 is a fragmentary side elevation of an anti-skid chain embodying my invention and illustrated in position upon a vehicle tire; Fig. 2 is an enlarged view of a portion of the circumferential chain stretches and a chain section lock associated therewith; Fig. 3 is a view of the circumferential chain link illustrated in Fig. 2 with an adjacent engaging link displaced to permit the assembling and locking of an anti-skid section of chain to be connected thereto; Fig. 4 is an enlarged cross-sectional view taken substantially along the line 4—4 of Fig. 2; and Fig. 5 is a perspective view of a preferred form of link locking means.

Considerable difficulty is experienced by users of anti-skid devices when it is attempted to replace a worn-out or broken anti-skid section of chain in that when it is desired to replace the chain sections, it is necessary to separate the links connecting them to the circumferential portions of the anti-skid chain by the use of a tool. My invention contemplates the provision of a very simple and effective connection between the transverse chain portions and the circumferential chain stretches whereby these transverse chain stretches, usually comprising hardened steel links, may be readily replaced by simply manually disconnecting an intermediate link which joins them to the circumferential chain stretches. In fulfilling this provision, however, I have been mindful of the commercial requirement that the transverse chain stretches, when once attached to the circumferential stretches, must be prevented from disconnection under severe traction conditions.

The convenient manner of accomplishing the foregoing is illustrated in the drawings wherein chain stretches 10 may comprise links of the usual construction for the circumferential chain stretches, while the anti-skid links of the stretches 11 may be formed of tempered steel as is the commercial practice and these respective chain stretches may be connected by detachable links 12 preferably formed of spring wire having a tensile strength equal to the tensile strength of the links comprising the stretches 11. The links 14 of the circumferential chain, to which the detachable links 12 connect the transverse chain stretches 11, are provided with locking plates 15 which prevent the disengagement of the links 12 from the links 14 when once placed in engagement therewith.

Figure 5:
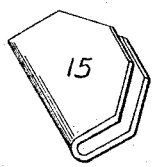

The lock plates 15 may comprise U-shaped pieces of metal, such as are illustrated in perspective in Fig. 5, of a width corresponding to substantially the major portion of the length of circumferential links comprising the chains 10 and may be permanently attached thereto in the manner shown in Fig. 4, by the use of convenient apparatus such as a punch press whereby the lock plates 15 may pivot within certain limits upon the link sections 14ª of the links 14. The connecting links 12 are of sufficient length whereby the free ends thereof comprising the hooks 17, may be manually compressed together as illustrated by the dot and dash lines 18 in Fig. 3.

The manner of attaching and detaching the link stretches 11 to the circumferential chain stretches comprising the links 10 and 14, may be effected as follows. The link 10ᵃ of the circumferential chain stretch which is adjacent to a link 14 may be shifted relative to the link 14 to the position shown in Fig. 3. The connecting link 12 may then have its free or hook ends compressed together manually whereupon the hooks may be brought into engagement with the link 14. The connecting link 12 may then be swung around the link 14 until the hook ends thereof slide over the plate to the position illustrated in Figs. 1 and 2. The circumferential link 10ᵃ may then be shifted around to its normal position, illustrated in Figs. 1 and 2, whereupon the connecting link 12 is limited in its shifting movement relative to the link 14 and is prevented from sliding off the lock plate 15 by an end portion of the link 14 or link 10ᵃ. The relation of the hook ends 17 to the lock plate 15 may of course be such that the dimension of the opening of the hooks is less than the diameter of the wire forming the link 14 plus twice the thickness of the metal forming the lock plate 15. It will be obvious therefore that the connecting link 12 cannot be disconnected from the circumferential link 14 without shifting the link 10ᵃ to the position shown in Fig. 3 which, of course, would be impossible when once the anti-skid chain is assembled upon a vehicle tire.

From the foregoing description of my invention, it will be apparent that by providing certain of the links of the circumferential chain stretches of an anti-skid chain with lock plates upon which detachable links having open ends may be mounted by sliding the open or hooked ends of the connecting links circumferentially, that it is possible to manually connect the transverse chain stretches or to disconnect such chain stretches to or from the circumferential chain stretches, without the use of tools. Furthermore, the shape of the detachable connecting links between the transverse chain stretches and circumferential chain stretches is such that they may be readily detached from the end links of the transverse chain stretches without necessitating the spreading of any of the links with a tool.

I claim:

1. In an anti-skid device comprising a plurality of circumferential chain stretches, transverse chain stretches, and detachable links connecting the ends of the transverse chain stretches to the circumferential chain stretches, lock plates carried by several of the links of the circumferential chain stretches adapted to be manually placed in engagement with said detachable links, the lock plates serving to prevent disengagement of the detachable links only when the device is operatively mounted upon a vehicle tire.

2. In an anti-skid device of the character described, a chain lock comprising an enlargement along one side of a link, a detachable link having a closed end and an open hook engaging the enlargement whereby said detachable links are locked in position only when the anti-skid device is operatively positioned upon a vehicle tire.

3. In an anti-skid chain a U-shaped link with open ends terminating in hooks adapted to pass over one side of a closed link and means including a member having a portion thereof formed to substantially fit a portion of the other side of the closed link permanently carried by the closed link permitting a sliding movement of the hook link thereover whereby the open ends of the hooks may be disengaged from the closed link.

4. In an anti-skid device comprising circumferential chain stretches, transverse chain stretches and detachable links connecting the ends of the transverse chain stretches to the circumferential chain stretches a lock plate formed of a bent strip of metal adapted to be permanently carried by a link of a circumferential chain stretch, and a U-shaped link adapted to be connected to a transverse chain stretch and having the free ends hook-shaped to engage the lock plate.

5. A link lock for the replaceable chain stretches in an anti-skid device comprising a closed link adapted to be part of a circumferential chain stretch of said device, one side of said link carrying an enlargement formed by a U-shaped metal plate bent around a portion thereof, and a U-shaped link adapted to be detachably connected to a transverse chain stretch of said device and having open ends thereof hook shaped, the hooks thereof being disengageable from the normal side of said closed chain link and adapted to slide over and into engagement with said enlargement whereby when the hook portions of the detachable link are in engagement with said enlargement, the disengagement of the hook link is prevented.

6. A chain link locking device for an anti-skid chain comprising a link forming a closed loop having an enlargement on one side thereof comprising a plate permanently attached thereto and a U-shaped open ended link having hooked ends in engagement with said plate and undetachable relative to the closed link when in engagement with said plate.

In testimony whereof, I hereunto affix my signature.

FRED D. RUCKMAN.